United States Patent [19]
Berger et al.

[11] 3,977,895
[45] Aug. 31, 1976

[54] METHOD OF REDUCING THE AMOUNT OF CADMIUM CAPABLE OF BEING EXTRACTED FROM CALCINED CADMIUM PIGMENT POWDER BY HUMAN GASTRIC JUICES

[75] Inventors: Rolf Berger, Ludwigsburg; Wolfgang Kuch, Asperg; Hartmut Endriss, Stuttgart-Kraherwald, all of Germany

[73] Assignee: BASF Farben & Fasern Aktiengesellschaft, Hamburg, Germany

[22] Filed: Nov. 26, 1975

[21] Appl. No.: 635,720

[30] Foreign Application Priority Data
Dec. 5, 1974 Germany............................ 2457390
Mar. 29, 1975 Germany............................ 2513964

[52] U.S. Cl. ........................... 106/301; 106/288 B; 106/292; 106/308 B

[51] Int. Cl.² ........................................... C09C 1/10
[58] Field of Search........ 106/292, 293, 301, 288 B, 106/308 B, 309

[56] References Cited
UNITED STATES PATENTS

| | | | |
|---|---|---|---|
| 3,220,868 | 11/1965 | Flasch................................ | 106/301 |
| 3,852,404 | 12/1974 | Daly.................................... | 106/301 |
| 3,856,546 | 12/1974 | Weiss................................. | 106/308 B |

Primary Examiner—Winston A. Douglas
Assistant Examiner—J. V. Howard
Attorney, Agent, or Firm—Hans Berman

[57] ABSTRACT

Acid-extractable cadmium in yellow, orange, or red cadmium pigments is reduced sharply without loss of tinctorial strength and other desirable pigment properties by suspending the pigment powder in water and adding approximately stoichiometric amounts of tin ions, preferably quadrivalent tin ions and sulfide ions, and recovering the solids from the mixture.

9 Claims, No Drawings

METHOD OF REDUCING THE AMOUNT OF CADMIUM CAPABLE OF BEING EXTRACTED FROM CALCINED CADMIUM PIGMENT POWDER BY HUMAN GASTRIC JUICES

This invention relates to cadmium bearing pigment powders, more specifically yellow, orange, and red pigment powders, and particularly to cadmium bearing pigment powders of reduced solubility, and to a method of producing such pigment powders.

The yellow, orange, and red pigment powders in which cadmium is a principal color-producing ingredient are cadmium sulfides, cadmium-zinc sulfides, and cadmium sulfide-selenides which may additionally contain tellurium and mercury, also extenders such as barium sulfate. All commercial cadmium bearing pigment powders are prepared by precipitation of one or all ingredients and subsequent calcining.

The commercial pigments contain cadmium almost entirely in the form of acid insoluble compounds, but they contain enough cadmium in a form soluble in 0.1 normal hydrochloric acid to cause undesirable effects in humans if ingested by mouth and attacked by gastric juices. German Industrial Standards DIN 55,974 and DIN 53,770 establish conditions under which commercial cadmium bearing pigment powders are to be extracted by 0.1 N hydrochloric acid to produce solubility or extractability data sufficiently similar to the capability of the tested materials to be extracted by human gastric juices. The amount of cadmium capable of being extracted from commercial cadmium orange or cadmium red pigment powder free from extenders is generally between 0.05% and 0.1%, while cadmium yellow pigment powder generally contains approximately 0.002% to 0.01% extractable cadmium.

It has been attempted to reduce the soluble fraction of cadmium bearing pigment powders by coating the pigment grains with compounds containing silicon, aluminum, titanium, or antimony, but such coatings affect the coloristic properties of the pigment in that they shift the hue, reduce the tinctorial strength, and may also reduce the gloss.

It is the primary object of this invention to provide a pigment powder and a method of preparing the same which avoids the potential physiological effects of commercial cadmium bearing pigments, yet is unimpaired in its coloristic characteristics.

According to the invention, a pigment powder of calcined cadmium yellow, cadmium orange, or cadmium red is suspended in an aqueous medium, and the suspension is mixed with a water soluble ionizable tin compound and with sulfide ions in an amount preferably stoichiometrically equivalent to the tin at a pH up to about 8.5. The solids in the suspension are then washed, filtered out, dried, and ground.

Better precipitates are obtained without undesirable oxidation if the pH value of the mixture is adjusted to approximately 5 to 6.

The amount of cadmium capable of being extracted from the cadmium bearing pigments so modified is only 1/1000 to 1/10 of that present in the starting material. Substantial improvement is achieved if the tin compound yields divalent tin ions, but quadrivalent tin ions are generally more effective and preferred. Some improvement is achieved by merely adding the tin compound to the pigment powder suspension under conditions which cause hydrolysis of the tin compound and formation of tin hydroxides or oxides, but reaction of the tin ions or of their primary products of hydrolysis with sulfide ions leads to superior products.

The amounts of tin compound and sulfide ions that are added to the pigment suspension are approximately proportional to the improvement achieved under otherwise uniform conditions. The smallest amount of tin compound which will produce a measurable improvement is generally determined by the sensitivity of the test for cadmium concentration in the acidic extract. A very substantial reduction of extractable cadmium can be achieved by 0.25 to 0.5% tin ions, based on the weight of the treated pigment powder, and by even smaller amounts, as will presently be shown. An addition of 0.5% tin ions can reduce the extractable cadmium in cadmium red or cadmium orange from about 0.07% to 0.015%. A reduction to 0.007% is achieved with 2% tin ions, to 0.0008% with 5% tin ions. The same amounts of tin produce corresponding reductions of extractable cadmium in cadmium yellow pigment powder.

The amount of sulfide ions is preferably closely equivalent to the tin ions present to precipitate tin sulfide. A significant excess of sulfide produces ineffective, soluble thiostannate. An amount of sulfide ions smaller than necessary for practically complete precipitation of the tin present is not harmful, but causes loss of relatively expensive tin compounds when the pigment powder is separated from the aqueous medium.

Zinc ions present in the precipitation mixture also react with the sulfide ions and enhance the effect of the tin compounds on the amount of residual extractable cadmium in the treated, cadmium bearing pigments. Significant improvements are achieved with as little as 0.1 to 1.0% tin ions, based on the weight of the treated pigment powder, when the pigment suspension additionally contains 0.1 to 0.2% zinc ions.

The following Examples further illustrate the invention. All percentage values are by weight unless stated otherwise.

EXAMPLE 1

100 g Cadmium red pigment powder was suspended in 300 ml water, and the suspension was mixed with 160 ml 3.6% stannic chloride ($SnCl_4.5H_2O$) solution. 6% Sodium sulfide solution was added in an amount stoichiometrically equivalent to the tin content to precipitate the tin ions. The mixture so obtained was washed until free from chloride ions, the solids were filtered off, dried, and ground.

The modified cadmium red pigment so obtained was found to contain 0.007% soluble cadmium, as defined above, as compared to 0.06% in a pigment powder taken through the same manipulative steps without tin and sulfide ions.

EXAMPLE 2

100 g Cadmium red pigment powder was suspended in 300 ml water, and the suspension was mixed with 400 ml 2.7% stannic chloride ($SnCl_4$) solution. 6% Sodium sulfide solution was added, and the solid fraction was worked up as in Example 1.

The modified pigment powder contained 0.0008% soluble cadmium as compared to 0.06% in the untreated pigment.

EXAMPLE 3

100 g Cadmium red pigment powder was suspended in 200 ml water, and a solution of 2.5 g $SnCl_4.5H_2O$ in 30 ml water was added. The hydrochloric acid in the suspension was neutralized with sodium hydroxide solution. Thereafter, a solution of 0.7 g $ZnSO_4.7H_2O$ in a mixture of 10 ml water and 10 ml 2N acetic acid was added, and a solution of 2.17 g $Na_2S$ (60%) in 60 ml water was added dropwise.

The solids in the suspension so obtained were worked up as in Example 1 and were found to contain 0.0002% soluble cadmium. The untreated red pigment powder contained 0.07% soluble cadmium.

EXAMPLE 4

100 g Cadmium yellow pigment powder was suspended in 100 ml water, and a concentrated solution of 3 g $SnCl_4.5H_2O$ neutralized with sodium hydroxide solution was added. A solution of 0.7 g $ZnSO_4.7H_2O$ in 10 ml water and 10 ml 2N acetic acid was admixed, and 2.54 g $Na_2S$ (60%) dissolved in 60 ml water was added dropwise. The suspension thereafter was worked up as in Example 1 and was found to contain 0.0004% soluble cadmium whereas the untreated pigment contained 0.003% cadmium capable of being extracted with dilute acid.

EXAMPLE 5

1000 kg Cadmium red pigment powder was suspended in 2000 liters water, and the suspension was mixed with solutions of 30 kg $SnCl_4.5H_2O$ in 800 liters water and of 7 kg $ZnSO_4.7H_2O$ in 200 liters water. Sodium sulfide was added to complete precipitation, and the suspension so obtained was adjusted to pH 6, washed free of chloride, filtered, and the recovered solids were dried and ground. The modified red pigment powder contained only 0.0002% soluble cadmium, whereas the starting material had a soluble cadmium content of 0.08%.

What is claimed is:

1. A method of reducing the amount of cadmium capable of being extracted form a calcined, cadmium-bearing pigment powder by dilute acids which comprises:
   a. suspending said powder in an aqueous medium;
   b. dissolving in said medium a water-soluble tin salt and an amount of sulfide ions not greater than stoichiometrically equivalent to the tin content of said tin salt at a pH not higher than 8.5; and
   c. recovering the solids from the mixture so obtained as a modified pulverulent pigment.

2. A method as set forth in claim 1, wherein said pH is approximately 5 to 6.

3. A method as set forth in claim 1, wherein said tin salt is a salt of quadrivalent tin, and said sulfide ions are dissolved in said medium in the form of an alkali metal sulfide.

4. A method as set forth in claim 3, wherein the amount of tin in said tin salt is between 0.1% and 5% of the weight of said powder.

5. A method as set forth in claim 4, wherein a water-soluble zinc salt is dissolved in said medium prior to said recovering, the amount of zinc in said zinc salt being between 0.1% to 0.2% of the weight of said pigment powder.

6. A method as set forth in claim 4, wherein said water soluble zinc salt is dissolved in said medium prior to said recovering, the amount of zinc in said zinc salt being sufficient to reduce the amount of cadmium capable of being extracted by said gastric juices from said recovered solids to less than the amount of cadmium capable of being extracted from said solids in the absence of said dissolving of said zinc salt.

7. A method as set forth in claim 6, wherein said amount of zinc is between 0.1 and 0.2% of the weight of said pigment powder, said tin content being between 0.1 and 1 percent of said weight.

8. A pulverulent pigment produced by the method of claim 1 and selected from the group consisting of cadmium red, cadmium orange, and cadmium yellow, said pigment containing less than 0.01% by weight cadmium capable of being extracted therefrom by gastric juices.

9. A pigment as set forth in claim 8, which is a cadmium yellow containing less than 0.001% by weight cadmium capable of being extracted therefrom by said gastric juices.

* * * * *